US006973382B2

(12) United States Patent
Rodriguez et al.

(10) Patent No.: US 6,973,382 B2
(45) Date of Patent: Dec. 6, 2005

(54) CONTROLLING AN ENGINE OPERATING PARAMETER DURING TRANSIENTS IN A CONTROL DATA INPUT BY SELECTION OF THE TIME INTERVAL FOR CALCULATING THE DERIVATIVE OF THE CONTROL DATA INPUT

(75) Inventors: Rogelio Rodriguez, Plainfield, IL (US); Adam C. Lack, Willow Springs, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/809,235

(22) Filed: Mar. 25, 2004

(65) Prior Publication Data

US 2005/0216174 A1    Sep. 29, 2005

(51) Int. Cl.[7] ............................................. F02M 25/07

(52) U.S. Cl. ................................ 701/108; 123/568.21

(58) Field of Search ............................. 701/106, 103, 701/105, 109; 123/568.21, 568.22, 568.27, 123/478, 580

(56) References Cited

U.S. PATENT DOCUMENTS 6,698,409 B1 *   3/2004   Kennedy et al. ............. 701/108

FOREIGN PATENT DOCUMENTS

JP                 8-21313 A *   1/1996    .......... F02M 25/07

* cited by examiner

Primary Examiner—Hieu T. Vo
(74) Attorney, Agent, or Firm—Dennis Kelly Sullivan; Susan L. Lukasik; Jeffrey P. Calfa

(57) ABSTRACT

Desired engine fueling data FQL_MFD_TQL is processed by a derivative variable time function (40) embodied in an algorithm to develop a data value EGR_MFD_DER representing the time derivative of desired fueling. The algorithm comprises certain selectable parameters (EGR_DTS, EGR_MFD_KF, EGR_MFD_KD). An iteration of the algorithm includes processing FQL_MFD_TQL according to a first function (40A) to yield a first data value and according to a second function (40B) to yield a second data value. A third function (40C) subtracts the second data value from the first to yield a data value for the time derivative that forms one input to a map (42). A second input to the map is a data value for mass airflow (MAF_GMS). The map provides data for calculating the set point of an EGR valve (36). The invention provides improved control of EGR during fueling transients.

21 Claims, 2 Drawing Sheets

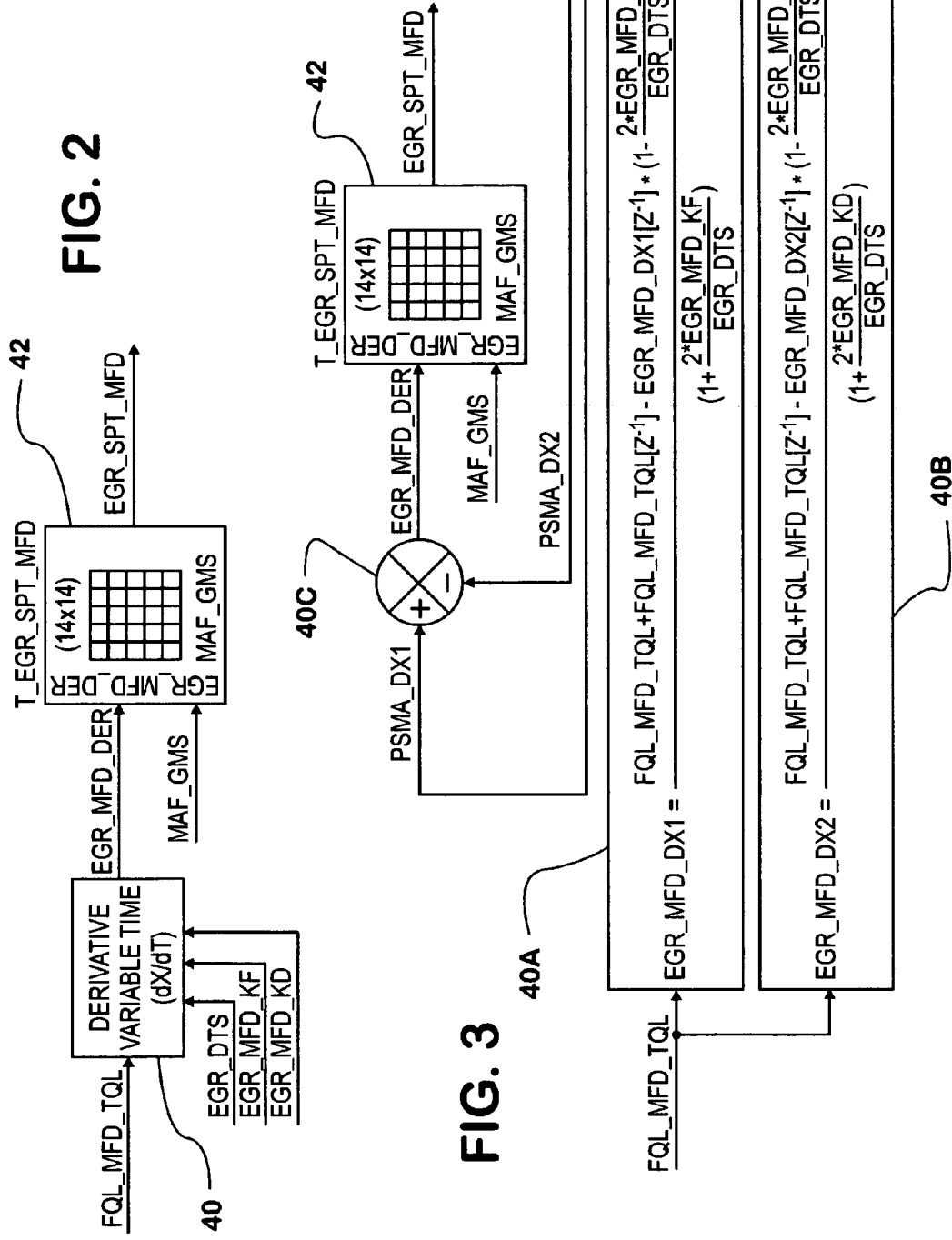

CONTROLLING AN ENGINE OPERATING PARAMETER DURING TRANSIENTS IN A CONTROL DATA INPUT BY SELECTION OF THE TIME INTERVAL FOR CALCULATING THE DERIVATIVE OF THE CONTROL DATA INPUT

FIELD OF THE INVENTION

This invention relates to internal combustion engines, such as control strategies like those in compression ignition engines having combustion chambers into which fuel is injected by fuel injectors for mixing with charge air that includes a controlled amount of recirculated exhaust gas. A particular aspect of the invention is concerned with improving engine performance within tailpipe emission constraints during engine fueling transients by processing desired engine fueling data in a novel way to control the set point for an EGR valve during such transients.

BACKGROUND OF THE INVENTION

A known electronic engine control system comprises a processor-based engine controller that processes data from various sources to develop control data for controlling certain functions of the engine, including fueling of the engine by injection of fuel into engine combustion chambers. Control of engine fueling involves various considerations, engine performance and tailpipe exhaust emissions being ones of major significance.

Proper improvements in control of engine fueling can reduce the amount of undesired products of combustion in tailpipe emissions and can provide better engine performance. Where laws and regulations concerning tailpipe emissions are becoming increasingly strict, an ability to achieve reduced tailpipe emissions without serious negative impact on engine performance and vehicle driveability is seen to be vitally important to engine and motor vehicle manufacturers.

Everyday operation of motor vehicles requires that their engines operate at different speeds and loads. Consequently, an engine will, from time to time, typically encounter changing speed and load, events that are transient in nature. Depending on particular driving situations, some transients are fairly gradual, others more extreme.

Certain transients may have significant impact on engine performance and tailpipe emissions. Engine performance directly affects vehicle driveability. For assuring driver satisfaction, engine performance should not be seriously impacted by changing speed and load. For assuring compliance with applicable tailpipe emission laws and regulations, transients must not generate excessive amounts of undesired emission constituents.

SUMMARY OF THE INVENTION

Briefly, one aspect of the present invention relates to improvements in control of the set point for an exhaust gas recirculation (EGR) valve during engine fueling transients. General principles of the invention contemplate the use of a derivative variable time function to process desired fueling data for yielding a data values for the derivative of engine fueling during the transient. Those data values and data values for mass airflow entering the engine are then processed according to a map of EGR set point data values correlated with fueling derivative data values and mass airflow data values. The data value from the map that is correlated with each particular fueling derivative data value and corresponding particular mass airflow data value is then used to set the set point for the EGR valve.

A generic aspect of the invention relates to an internal combustion engine comprising a control system for controlling an engine operating parameter in accordance with processing of control data that includes certain control data whose value is at times transient. A processor processes the certain control data according to an algorithm that iterates during a transient to yield data values for the time derivative of the certain control data during the transient. An iteration of the algorithm includes processing the certain control data according to a first function to yield a first data value, processing the certain control data according to a second function to yield a second data value, and processing the first and second data values according to a third function to yield a data value for the time derivative of the certain control data.

A more particular aspect of the invention relates to selection of the time intervals that are used to calculate data values for the derivative during the transient.

The invention is particularly useful in control of the set point of an EGR valve during a transient in control data representing desired engine fueling.

Another generic aspect relates to the control system that has just been described.

Still another generic aspect relates to the method that is performed by the engine and system just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 2 is a schematic software strategy diagram illustrative of the general principles of the invention as implemented in an engine control strategy.

FIG. 3 shows more detail of an exemplary software strategy diagram.

DESCRIPTION OF THE PREFERRED EMBODIMENT

Figure 1:
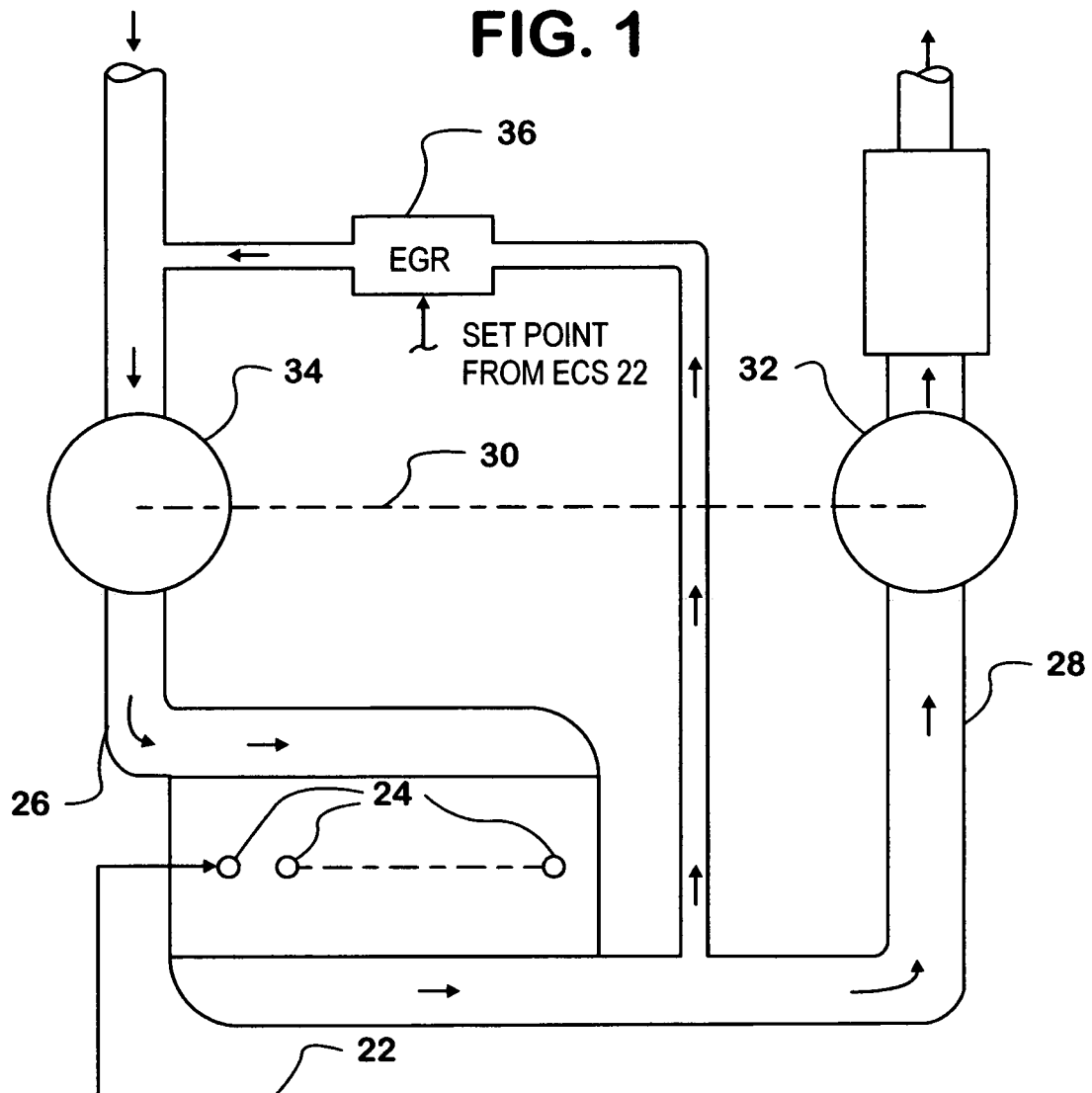
FIG. 1 is a general schematic diagram of a portion of an exemplary diesel engine relevant to an understanding of the invention.

FIG. 1 shows a schematic diagram of a portion of an exemplary diesel engine 20 relevant to an understanding of principles of the present invention. Engine 20 is used for powering a motor vehicle and comprises a processor-based engine control system (ECS) 22 that processes data from various sources to develop various control data for controlling various aspects of engine operation. The data processed by ECS 22 may originate at external sources, such as sensors, and/or be generated internally.

ECS 22 controls the operation of electric-actuated fuel injectors 24, each of which mounts on the engine in association with a respective engine combustion chamber comprising a cylinder within which a piston reciprocates. Each piston is coupled to a crankshaft by a corresponding connecting rod. A processor of ECS 22 can process data sufficiently fast to calculate, in real time, the timing and duration of fuel injector actuation to set both the timing and the amount of fueling. Specific details of the fuel injectors and exactly how they are controlled is unnecessary for understanding the present invention, and so such details will not be described here.

Engine 20 further comprises an intake system 26 through which charge air enters the cylinders and an exhaust system 28 through which products of combustion exit the cylinders. The particular engine shown here is turbocharged by a turbocharger 30 having a turbine 32 in exhaust system 28 and a compressor 34 in intake system 26.

Some of the engine exhaust gas is recirculated from exhaust system 28 through an EGR valve 36 to intake system 26. EGR valve 36 is under the control of ECS 22 to selectively restrict the flow of recirculated exhaust gas. Specifically, ECS 22 develops data defining a set point for EGR valve 36 that sets the restriction that valve 36 imposes on the recirculated exhaust gas flow, thereby in effect setting the EGR flow.

Among the control data processed by ECS 22 in controlling engine 20 are engine speed data N, acceleration pedal position data APS, and mass airflow MAF entering via intake system 26. ECS 22 contains appropriate algorithms for processing selected data to perform various control functions. One such function is engine fueling, and engine speed N and accelerator pedal position APS are used as primary parameters for developing a data value for desired engine fueling. Secondary parameters may also be used regularly, or only at certain times, in conjunction with engine speed and accelerator pedal position to set desired engine fueling.

In accordance with principles of the invention, desired engine fueling data FQL_MFD_TQL is processed as shown in FIG. 2 to develop a data value EGR_MFD_DER that is representative of the time derivative of desired fueling. If the data value of desired fueling is constant, the derivative is zero. A changing data value is representative of a fueling transient that may occur for any of various reasons. The data value for EGR_MFD_DER is indicative of the rate of change in desired fueling, such as may occur when the driver depresses or releases the accelerator pedal.

The data value for desired engine fueling FQL_MFD_TQL is processed according to a derivative variable time function 40 to yield a data value for EGR_MFD_DER representing the rate at which desired engine fueling is changing, i.e., is differentiated with respect to time to yield its derivative. That data value is then processed according to a map 42. Certain principles of the invention involve details of function 40, and they will be more fully described later.

Map 42 contains a number of data values for the EGR set point (EGR_SPT_MFD), each of which correlates with a respective pair of data values for the derivative (EGR_MFD_DER) of FQL_MFD_TQL and for mass airflow MAF_GMS entering the engine. Each data value for the derivative (EGR_MFD_DER) represents a corresponding fractional span of a larger range of while each data value for mass airflow entering the engine MAF_GMS represents a corresponding fractional span of a larger range of airflows. For any given combination of rate-of-change of desired fueling and mass airflow entering the engine, rate-of-change of desired fueling will fall within one of its fractional spans in map 42, and mass airflow within one of its fractional spans, causing the particular set point data value corresponding to the two respective fractional spans to be supplied and used to set the set point for EGR valve 36.

Certain characteristics of function 40 are set by certain parameters. A parameter EGR_DTS sets the derivative function time interval (dT). A parameter EGR_MFD_KF sets the gain of a derivative noise filter. A parameter EGR_MFD_KD sets the derivative function gain. These three parameters are selectable according to a particular engine and/or a particular operating condition of the engine. Consequently they may be generally considered either as programmable parameters for an engine or as variable parameters whose values can change during engine operation depending on operating conditions.

FIG. 3 shows a specific example of algorithm for implementing function 40. ECS 22 executes the algorithm by processing data at an execution rate sufficiently fast to update the set point data value to closely follow changing airflow and desired fueling data values. The algorithm comprises three calculational steps 40A, 40B, 40C.

Step 40A computes a data value for a parameter EGR_MFD_DX1, step 40B computes a data value for a parameter EGR_MFD_DX2, and step 40C subtracts the computed data value for EGR_MFD_DX2 from the computed data value for EGR_MFD_DX1 to yield a data value for EGR_MFD_DER.

Algorithm step 40A is presented as a fraction having a numerator and a denominator. The numerator comprises three terms, the first two of which are the data value for FQL_MFD_TQL that exists when the strategy iterates and the data value for FQL_MFD_TQL at the immediately previous iteration. The third term is the product of the data value for EGR_MFD_DX1 from the immediately previous iteration and the data value of the parenthetical that is shown to contain the selectable parameters EGR_MFD_KF and EGR_DTS. The data value for the parenthetical is the difference between a data value of unity and twice the data value for EGR_MFD_KF divided by the data value for EGR_DTS. The denominator is also the data value for the parenthetical.

Algorithm step 40B is also presented as a fraction having a numerator and a denominator. The numerator comprises three terms, the first two of which are the data value for FQL_MFD_TQL that exists when the strategy iterates and the data value for FQL_MFD_TQL at the immediately previous iteration. The third term is the product of the data value for EGR_MFD_DX2 from the immediately previous iteration and the data value of the parenthetical that is shown to contain the selectable parameters EGR_MFD_KD and EGR_DTS. The data value for the parenthetical is the difference between a data value of unity and twice the data value for EGR_MFD_KD divided by the data value for EGR_DTS. The denominator is also the data value for the parenthetical.

Algorithm step 40C comprises subtracting the data value from step 40B from the data value from step 40A to thereby yield the data value for EGR_MFD_DER.

Figure 4:
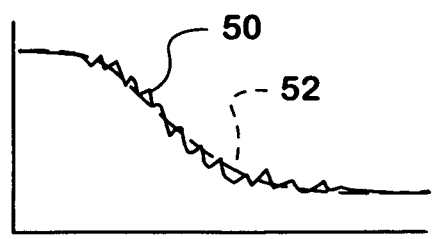
FIG. 4 is a graph plot of representative traces useful in understanding principles of the invention.

Derivative variable time function 40 serves to attenuate the effect of the severity of a transient and of noise in a transient on the calculated data value for EGR_MFD_DER. This is graphically shown in FIG. 4. The continuous trace 50 is representative of the real time value of a transient. The trace is not smooth like the corresponding idealized trace 52 because of extraneous influences such as noise and severity of the transient. Because a digital processing system like ECS 22 processes data at the iteration rate of the strategy, successive iterations take only a succession of "snapshots" of the continuous trace, rather than continuously processing the trace.

By using a suitable algorithm having one or more selectable parameters that include selection of the time interval between snapshots, a control strategy can attenuate the effect of spurious influences on the data value of the desired output, EGR_MFD_DER in this instance, during a transient.

In summary then, the disclosed strategy develops EGR set point data during engine transients for securing EGR flow consistent with both good engine performance and tailpipe emission control. Exactly how the EGR set point data is subsequently processed will depend on the particular EGR valve and its control strategy.

Generic principles of the invention are applicable to engine control data other than engine fueling data and to controlled parameters other than EGR set point. Accelerator pedal position transients can be processed according to an algorithm having one or more selectable parameters that include the interval of time between snapshots of accelerator pedal position.

While a presently preferred embodiment of the invention has been illustrated and described, it should be appreciated that principles of the invention apply to all embodiments falling within the scope of the following claims.

What is claimed is:

1. An internal combustion engine comprising:
   a control system for controlling an engine operating parameter in accordance with processing of control data that includes a control data input whose value is at times transient; and
   a processor for processing that control data input according to an algorithm that iterates during a transient to yield data values for the time derivative of the control data input during the transient, wherein an iteration of the algorithm includes processing the control data input according to a first function to yield a first data value, processing the control data input according to a second function to yield a second data value, and processing the first and second data values according to a third function to yield a data value for the time derivative of the control data input.

2. An engine as set forth in claim 1 wherein both first and second functions comprise a selectable parameter representing a selectable time interval used in calculating the data value for the time derivative of the control data input.

3. An engine as set forth in claim 1 wherein both first and second functions comprise a first selectable parameter representing a selectable time interval used in calculating the data value for the time derivative of the control data input, the first function further comprises a second selectable parameter representing a gain for the first function, and the second function further comprises a third selectable parameter representing a gain for the second function.

4. An engine as set forth in claim 3 wherein the processing according to the third function comprises subtracting the second data value from the first data value.

5. An engine as set forth in claim 4 including an EGR valve, and wherein the engine operating parameter is EGR valve set point, the control data input represents desired engine fueling data, and the data value of the time derivative of desired engine fueling data resulting from processing by the processor is further processed by the processor with a data value for mass airflow entering the engine according to a schedule to develop a data value used in setting the EGR valve set point during a transient.

6. A control system in an internal combustion engine for controlling an engine operating parameter in accordance with processing of control data that includes a control data input whose value is at times transient, the control system comprising:
   a processor for processing that control data input according to an algorithm that iterates during a transient to yield data values for the time derivative of the control data input during the transient, wherein an iteration of the algorithm includes processing the control data input according to a first function to yield a first data value, processing the control data input according to a second function to yield a second data value, and processing the first and second data values according to a third function to yield a data value for the time derivative of the control data input.

7. A control system as set forth in claim 6 wherein both first and second functions comprise a selectable parameter representing a selectable time interval used in calculating the data value for the time derivative of the control data input.

8. A control system as set forth in claim 6 wherein both first and second functions comprise a first selectable parameter representing a selectable time interval used in calculating the data value for the time derivative of the control data input, the first function further comprises a second selectable parameter representing a gain for the first function, and the second function further comprises a third selectable parameter representing a gain for the second function.

9. A control system as set forth in claim 8 wherein the processing according to the third function comprises subtracting the second data value from the first data value.

10. A control system as set forth in claim 9 wherein the engine operating parameter is EGR valve set point, the control data input represents desired engine fueling data, and the data value of the time derivative of desired engine fueling data resulting from processing by the processor is further processed by the processor with a data value for mass airflow entering the engine according to a schedule to develop a data value used in setting the EGR valve set point during a transient.

11. A method for controlling an engine operating parameter in an internal combustion engine includes a processor for processing of control data that includes a control data input whose value is at times transient, the method comprising:
   processing that control data input according to an algorithm that iterates during a transient to yield data values for the time derivative of the control data input during the transient, including processing the control data input during an iteration of the algorithm according to a first function to yield a first data value, processing the control data input during the iteration according to a second function to yield a second data value, and processing the first and second data values during the iteration according to a third function to yield a data value for the time derivative of the control data input.

12. A method as set forth in claim 11 wherein both first and second functions comprise a selectable parameter representing a selectable time interval, and the processing includes using a data value for the selectable parameter to calculate the time derivative of the control data input.

13. A method as set forth in claim 11 wherein both first and second functions comprise a first selectable parameter representing a selectable time interval, the first function further comprises a second selectable parameter representing a gain for the first function, the second function further comprises a third selectable parameter representing a gain for the second function, and the processing further includes using data values for the first, second, and third selectable parameters to calculate the time derivative of the control data input.

14. A method as set forth in claim 13 wherein the processing according to the third function comprises subtracting the second data value from the first data value.

15. A method as set forth in claim 14 wherein the engine operating parameter is EGR valve set point, the control data input represents desired engine fueling data, and the data value of the time derivative of desired engine fueling data resulting from processing by the processor is further processed by the processor with a data value for mass airflow entering the engine according to a schedule to develop a data value used in setting the EGR valve set point during a transient.

16. An internal combustion engine comprising:
  a control system for controlling exhaust gas recirculation in accordance with processing of desired engine fueling data whose value is at times transient; and
  a processor for processing that desired engine fueling data according to an algorithm that iterates during a transient in the desired engine fueling data to yield data values for the time derivative of desired engine fueling during the transient, wherein an iteration of the algorithm includes processing the desired engine fueling data according to a function that comprises at least one selectable parameter including a selectable time interval, and for processing the data values for the time derivative of desired engine fueling and data values of mass airflow into the engine to yield a data value for setting exhaust gas recirculation.

17. An engine as set forth in claim 16 wherein the at least one selectable parameter further includes a selectable parameter representing a gain for a first term of the function, a selectable parameter representing a gain for a second term of the function, and the function comprises subtraction of its second term from its first term.

18. A control system for controlling exhaust gas recirculation in an internal combustion engine in accordance with processing of desired engine fueling data whose value is at times transient, the control system comprising:
  a processor for processing that desired engine fueling data according to an algorithm that iterates during a transient in the desired engine fueling data to yield data values for the time derivative of desired engine fueling during the transient, wherein an iteration of the algorithm includes processing the desired engine fueling data according to a function that comprises at least one selectable parameter including a selectable time interval, and for processing the data values for the time derivative of desired engine fueling and data values of mass airflow into the engine to yield a data value for setting exhaust gas recirculation.

19. A control system as set forth in claim 18 wherein the at least one selectable parameter further includes a selectable parameter representing a gain for a first term of the function, a selectable parameter representing a gain for a second term of the function, and the function comprises subtraction of its second term from its first term.

20. A method for controlling exhaust gas recirculation in an internal combustion engine includes a processor for processing of desired engine fueling data whose value is at times transient, the method comprising:
  processing that desired engine fueling data according to an algorithm that iterates during a transient in the desired engine fueling data to yield data values for the time derivative of desired engine fueling during the transient, wherein an iteration of the algorithm includes processing the desired engine fueling data according to a function that comprises at least one selectable parameter including a selectable time interval; and
  processing the data values for the time derivative of desired engine fueling and data values of mass airflow into the engine to yield a data value for setting exhaust gas recirculation.

21. A method as set forth in claim 20 wherein the at least one selectable parameter further includes a selectable parameter representing a gain for a first term of the function, a selectable parameter representing a gain for a second term of the function, and the function comprises subtracting its second term from its first term.

* * * * *